(12) United States Patent
Taherzadeh Boroujeni et al.

(10) Patent No.: US 11,418,278 B2
(45) Date of Patent: Aug. 16, 2022

(54) CONFIGURED DEPENDENCY BETWEEN MODULATION AND CODING SCHEME (MCS) AND POWER CONTROL

(71) Applicant: QUALCOMM Incorporated, San Diego, CA (US)

(72) Inventors: Mahmoud Taherzadeh Boroujeni, San Diego, CA (US); Sony Akkarakaran, Poway, CA (US); Tao Luo, San Diego, CA (US); Junyi Li, Chester, NJ (US); Kapil Gulati, Montgomery, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 17/022,681

(22) Filed: Sep. 16, 2020

(65) Prior Publication Data
US 2021/0091878 A1 Mar. 25, 2021

Related U.S. Application Data

(60) Provisional application No. 62/904,626, filed on Sep. 23, 2019.

(51) Int. Cl.
*H04L 1/00* (2006.01)
*H04L 5/00* (2006.01)
(Continued)

(52) U.S. Cl.
CPC ......... *H04L 1/0003* (2013.01); *H04B 7/0626* (2013.01); *H04B 7/0632* (2013.01);
(Continued)

(58) Field of Classification Search
CPC ..... H04L 1/0002; H04L 5/003; H04L 5/0048; H04L 5/005; H04L 1/0001; H04L 1/0003; H04L 29/08304; H04L 29/08306; H04W 52/38; H04W 52/383; H04W 92/00; H04W 92/16; H04W 92/18; H04W 52/18;
(Continued)

(56) References Cited

U.S. PATENT DOCUMENTS 10,736,166 B2 * 8/2020 Abedini ................ H04W 76/15
2002/0123351 A1 * 9/2002 Miyoshi .............. H04W 52/262
455/452.2
(Continued)

FOREIGN PATENT DOCUMENTS

EP 2639983 A1 9/2013
WO 2015164251 A1 10/2015

OTHER PUBLICATIONS

International Search Report and Written Opinion—PCT/US2020/051244—ISA/EPO—dated Dec. 21, 2020.

*Primary Examiner* — Warner Wong
(74) *Attorney, Agent, or Firm* — Patterson and Sheridan LLP

(57) ABSTRACT

Certain aspects of the present disclosure provide techniques for sidelink communication. A method that may be performed by a user equipment (UE) includes selecting a modulating and coding scheme (MCS) and a transmission power based on a configured dependency between one or more candidate MCSs and one or more candidate transmission powers, and transmitting, via a sidelink channel, one or more frames using the selected MCS and the selected transmission power.

21 Claims, 8 Drawing Sheets

(51) Int. Cl.
*H04W 52/38* (2009.01)
*H04W 52/22* (2009.01)
*H04B 7/06* (2006.01)
*H04W 52/36* (2009.01)
*H04W 92/18* (2009.01)

(52) U.S. Cl.
CPC ......... *H04L 5/0048* (2013.01); *H04W 52/228* (2013.01); *H04W 52/365* (2013.01); *H04W 52/38* (2013.01); *H04W 92/18* (2013.01)

(58) Field of Classification Search
CPC ... H04W 52/20; H04W 52/22; H04W 52/228; H04W 52/262; H04W 72/0473; H04W 76/14; H04B 7/0621; H04B 7/0626; H04B 7/0632
See application file for complete search history.

(56) References Cited

U.S. PATENT DOCUMENTS

| | | | | |
|---|---|---|---|---|
| 2008/0137577 | A1* | 6/2008 | Habetha | H04W 52/267 370/337 |
| 2011/0235604 | A1* | 9/2011 | Inoue | H04L 1/0003 370/328 |
| 2013/0258968 | A1* | 10/2013 | Hong | H04L 1/0003 370/329 |
| 2014/0140312 | A1* | 5/2014 | Lee | H04B 7/0452 370/329 |
| 2016/0330695 | A1* | 11/2016 | Benjebbour | H04W 72/042 |
| 2017/0041911 | A1* | 2/2017 | Yamamoto | H04J 13/004 |
| 2018/0176747 | A1* | 6/2018 | Li | H04L 67/14 |
| 2019/0045542 | A1* | 2/2019 | Yang | H04B 7/0617 |
| 2019/0222982 | A1* | 7/2019 | Cao | H04W 76/27 |
| 2019/0356451 | A1* | 11/2019 | Zhang | H04L 5/0032 |
| 2020/0092692 | A1* | 3/2020 | Wang | H04W 4/40 |
| 2020/0106547 | A1* | 4/2020 | Wu | H04W 4/70 |
| 2020/0229029 | A1* | 7/2020 | Yasukawa | H04L 1/08 |
| 2020/0305176 | A1* | 9/2020 | Hu | H04W 72/1263 |
| 2021/0120528 | A1* | 4/2021 | Peng | H04W 4/40 |
| 2021/0227477 | A1* | 7/2021 | Lee | H04W 72/04 |

* cited by examiner

502 →

|  | If PH <2dB | If PH > 2dB |
|---|---|---|
| CQI=0 | MCS0, TxPower +0dB to +2dB | MCS1, TxPower +2dB or greater |
| CQI=1 | MCS3, TxPower +0dB to +2dB | MCS4, TxPower +2dB or greater |

504 →

|  | If PH <2dB | If 2dB<PH<4dB | If PH > 4dB |
|---|---|---|---|
| CQI=0 | MCS0, TxPower +0dB to +2dB | MCS1, TxPower +2dB to +4dB | MCS2, TxPower +4dB or greater |
| CQI=1 | MCS3, TxPower +0dB to +2B | MCS4, TxPower +2dB to +4dB | MCS5, TxPower +4dB or greater |

FIG. 5

CONFIGURED DEPENDENCY BETWEEN MODULATION AND CODING SCHEME (MCS) AND POWER CONTROL

CROSS-REFERENCE TO RELATED APPLICATION

This application claims benefit of and priority to U.S. Provisional Application No. 62/904,626, filed Sep. 23, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for sidelink communication.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved sidelink communication.

Certain aspects provide a method for wireless communication. The method generally includes selecting a modulating and coding scheme (MCS) and a transmission power based on a configured dependency between one or more candidate MCSs and one or more candidate transmission powers, and transmitting, via a sidelink channel, one or more frames using the selected MCS and the selected transmission power.

Certain aspects provide a method for wireless communication. The method generally includes selecting a configured dependency between one or more candidate MCSs and one or more candidate transmission powers for communication by a user-equipment (UE), and transmitting an indication of the configured dependency to the UE.

Certain aspects provide an apparatus for wireless communication. The apparatus generally includes a memory and one or more processors, the memory and the one or more processors being configured to select a MCS and a transmission power based on a configured dependency between of one or more candidate MCSs and one or more candidate transmission powers, and transmit, via a sidelink channel, one or more frames using the selected MCS and the selected transmission power.

Certain aspects provide an apparatus for wireless communication. The apparatus generally includes a memory and one or more processors, the memory and the one or more processors being configured to select a configured dependency between one or more candidate MCSs and one or more candidate transmission powers for communication by a UE, and transmit an indication of the configured dependency to the UE.

Certain aspects provide an apparatus for wireless communication. The apparatus generally includes means for selecting a MCS and a transmission power based on a configured dependency between one or more candidate MCSs and one or more candidate transmission powers, and means for transmitting, via a sidelink channel, one or more frames using the selected MCS and the selected transmission power.

Certain aspects provide an apparatus for wireless communication. The apparatus generally includes means for selecting a configured dependency between one or more candidate MCSs and one or more candidate transmission powers for communication by a UE, and means for transmitting an indication of the configured dependency to the UE.

Certain aspects provide a computer readable medium having instructions stored thereon to cause an apparatus to select a MCS and a transmission power based on a configured dependency between candidate MCSs and candidate transmission powers, and transmit, via a sidelink channel, one or more frames using the selected MCS and the selected transmission power.

Certain aspects provide a computer readable medium having instructions stored thereon to cause an apparatus to select a configured dependency between candidate MCSs and candidate transmission powers for communication by a UE, and transmit an indication of the configured dependency to the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 illustrates tables indicating combinations of candidate modulation and coding schemes (MCSs) and candidate transmission powers, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
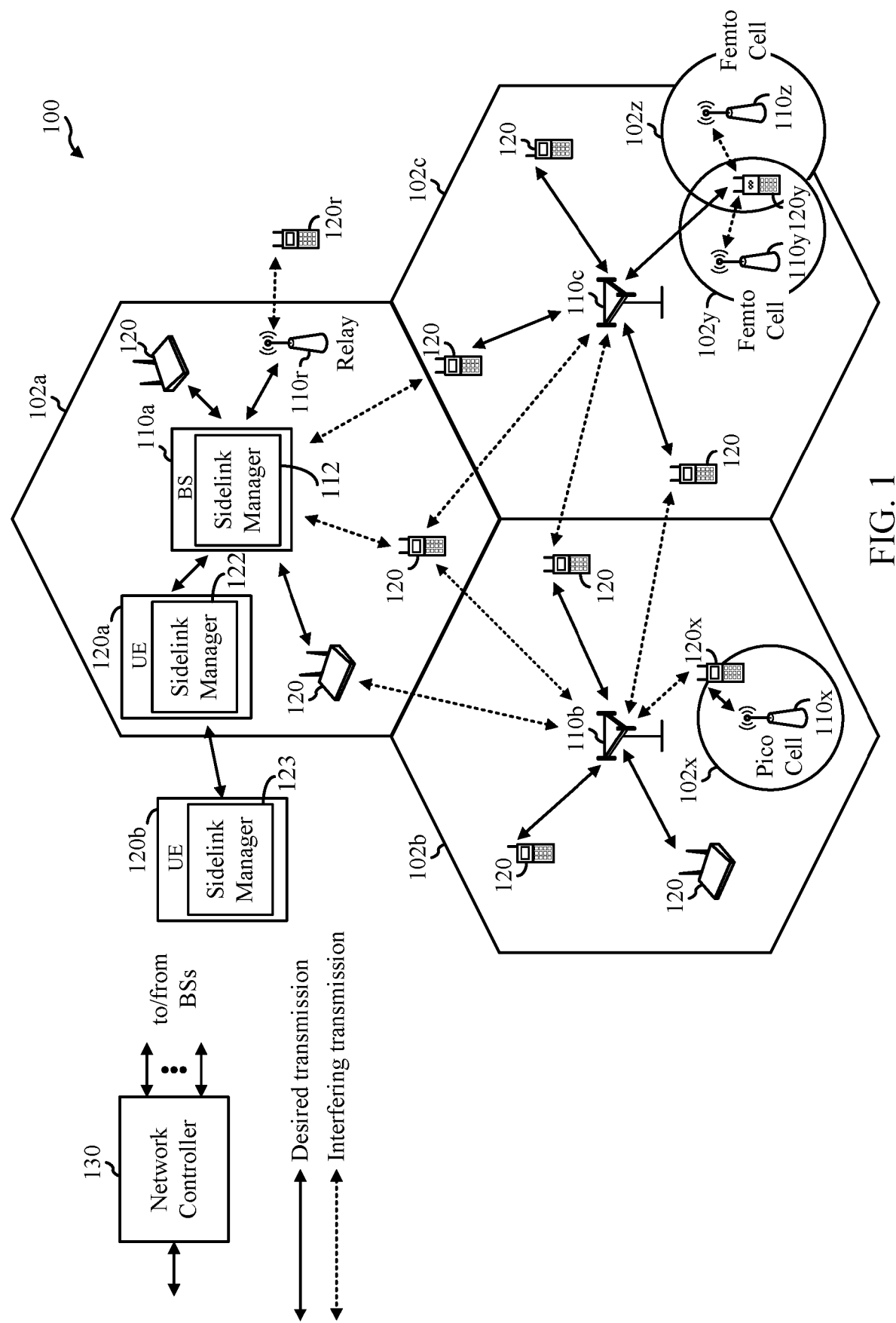
FIG. 1 is a block diagram conceptually illustrating an example telecommunications system, in accordance with certain aspects of the present disclosure.

Aspects of the present disclosure provide apparatus, methods, processing systems, and computer readable mediums for selection of a modulation and coding scheme (MCS) and transmission power. The MCS and transmission power may be selected based on a configured dependency between candidate MCSs and candidate transmission powers. For instance, various tables may be configured at the UE, each table indicating combinations of candidate MCSs and candidate transmission powers. For example, each of the set of configured combinations may map one of the candidate MCSs to one or more of the candidate transmission powers. The UE may select the MCS and the transmission power to be used for a sidelink transmission by selecting one of the configured combinations of the candidate MCSs and candidate transmission powers. In some cases, the table to be used for the selection of the MCS and the transmission power may be indicated to the UE by a wireless node, such as a base station (BS) or another UE. For instance, a BS may select between two tables, where one table allows for a higher transmission power than the other table. The BS may select the table that allows for the higher transmission power when the level of interference associated with the sidelink channel is low.

The following description provides examples of sidelink techniques in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may manage a configuration for sidelink communication. As shown in FIG. 1, the BS 110a and UE 120b may include respective sidelink managers 112, 123. The sidelink manager 112, 123 may be configured to select a dependency table that indicates a combination of candidate MCSs and transmission powers, in accordance with aspects of the present disclosure. As shown in FIG. 1, the UE 120a includes a sidelink manager 122. The sidelink manager 122 may be configured to select an MCS and transmission power based on a dependency table indicating a combination of candidate MCSs and transmission powers, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
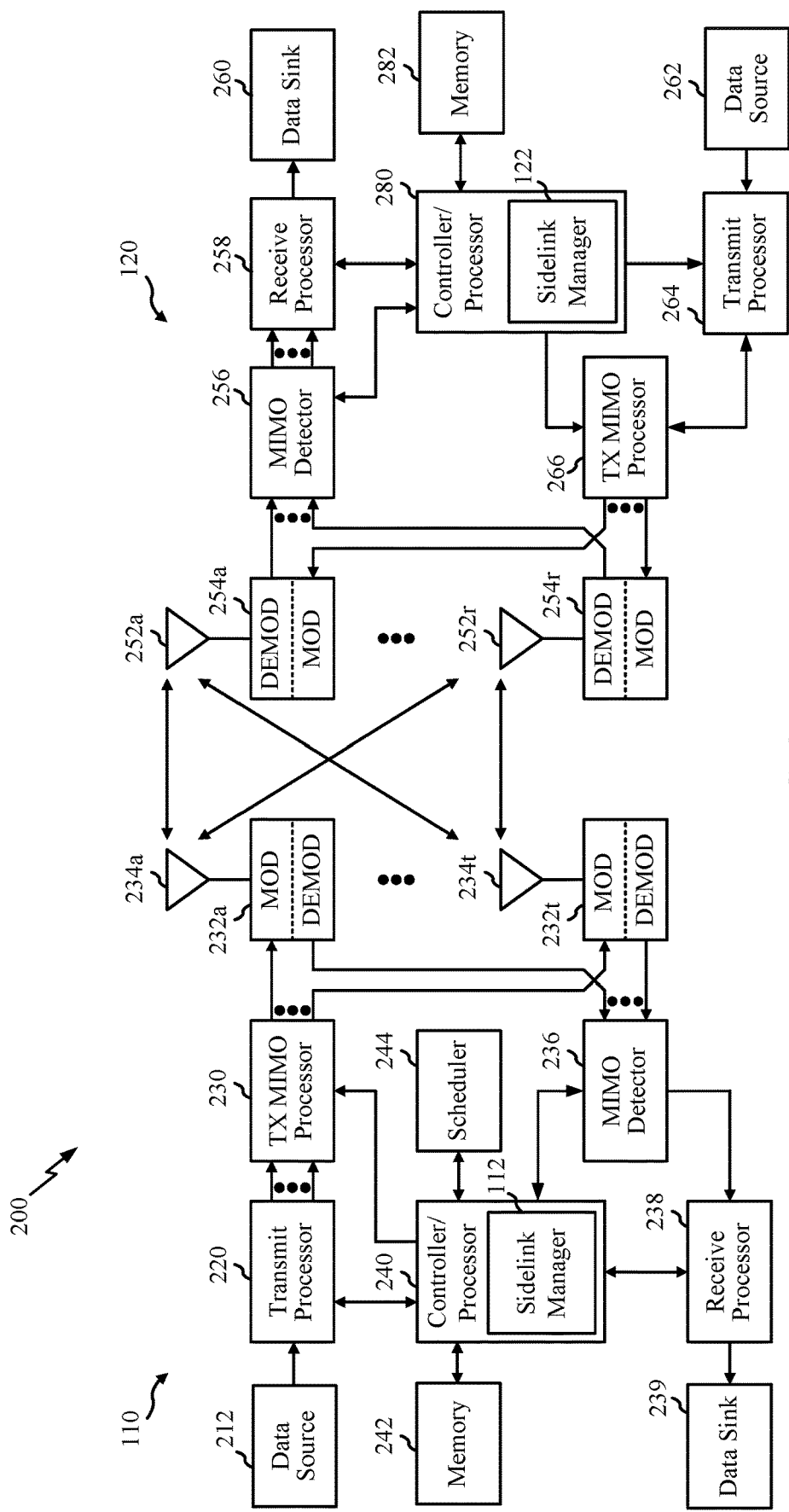
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has a sidelink manager 112 that may be configured to select a dependency table that indicates a combination of candidate MCSs and transmission powers, according to aspects described herein. As shown in FIG. 2, the controller/processor 280 of the UE 120a has a sidelink manager 122 that may be configured to select an MCS and transmission power based on a dependency table indicating a combination of candidate MCSs and transmission powers, according to aspects described herein. Although shown at the Controller/Processor, other components of the UE 120a and BS 110a may be used performing the operations described herein.

Figures 3A, 3B:
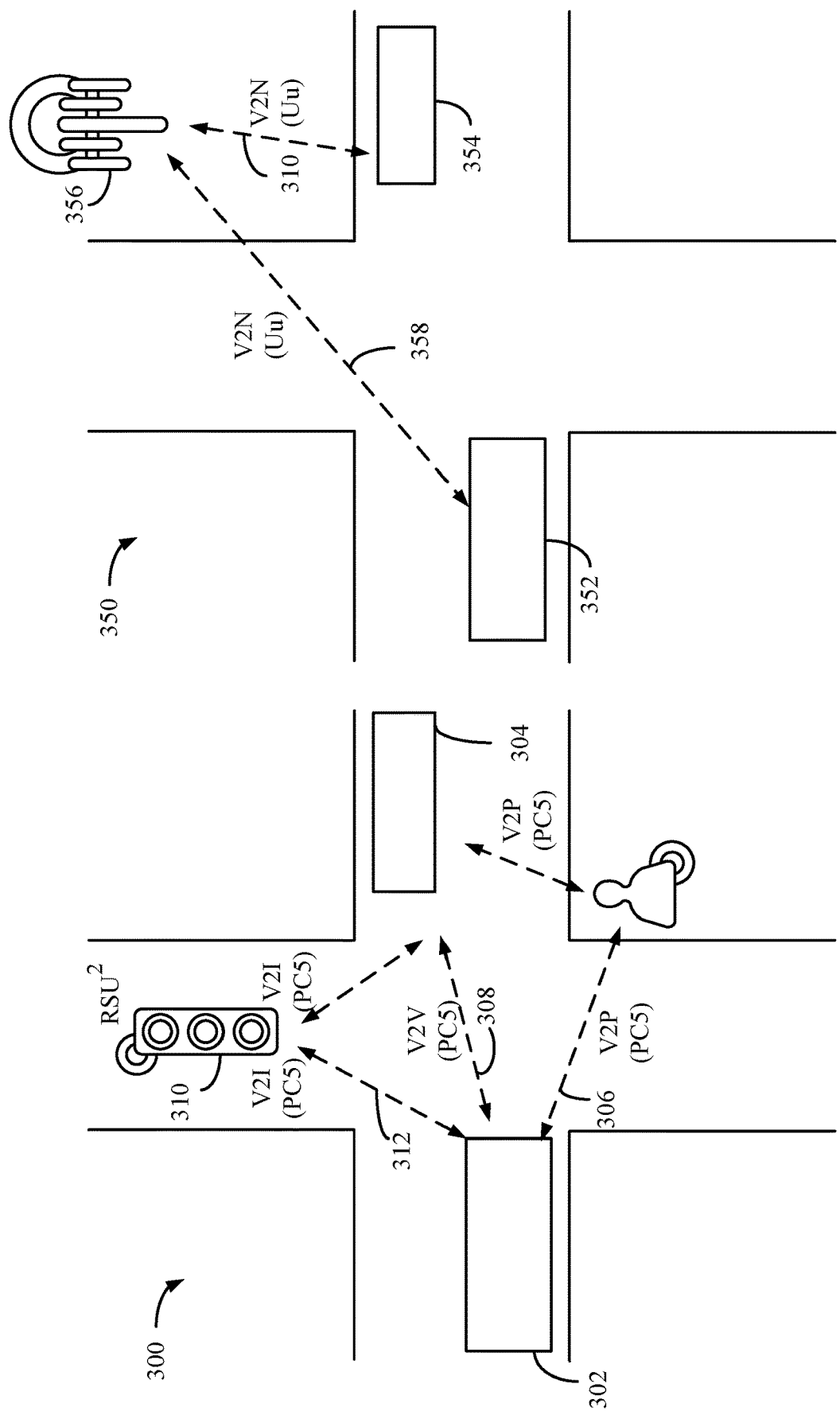
FIGS. 3A and 3B show diagrammatic representations of example vehicle to everything (V2X) systems in accordance with some aspects of the present disclosure.

FIGS. 3A and 3B show diagrammatic representations of example vehicle to everything (V2X) systems in accordance with some aspects of the present disclosure. For example, the UEs shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE).

Referring to FIG. 3A, a V2X system 300 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links 358 and 310 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Example Techniques for Selection of Modulation and Coding Scheme (MCS) and Power Control Channel state information (CSI) in new radio (NR) includes a variety of channel quality metrics, such as Channel Quality Indicator (CQI), Precoding Matrix Indicator (PMI), CSI-RS Resource Indicator (CRI), Strongest Layer Indication (SLI), Rank Indication (RI), and L1-RSRP (e.g., for beam management). For vehicle to everything (V2X) deployments, such as the deployment described with reference to FIGS. 3A and 3B, CSI reporting may be enabled and disabled by configuration. For flexibility, devices may be configured to report only a subset of the metrics for CSI reporting. Currently, there is no standalone reference signal (RS) transmission scheme dedicated for CSI reporting for sidelink channels between devices and there is limited sidelink CSI reporting. For instance, no more than 2 ports may be supported for sidelink CSI-RS for CQI/RI measurement. Moreover, sidelink CSI-RS may be confined within the physical sidelink shared channel (PSSCH) transmission.

In the access link between a UE and a base station, the UE transmits reports such as a power headroom report (PHR) to the base station and the base station (which is also the receiver) determines the uplink UL transmit power of UE via the access link. However, in sidelink between multiple UEs, PHR may not be useful because there is a more symmetric relation between the transmitter and receiver UEs. Certain aspects of the present disclosure are generally directed to techniques in sidelink for adjustment of MCS and transmit power of a UE, based on various parameters available to the UE, such as parameters in a CSI report. Certain aspects also provide techniques for a base station to affect the transmit power of sidelink UEs to control interference.

Figure 4:
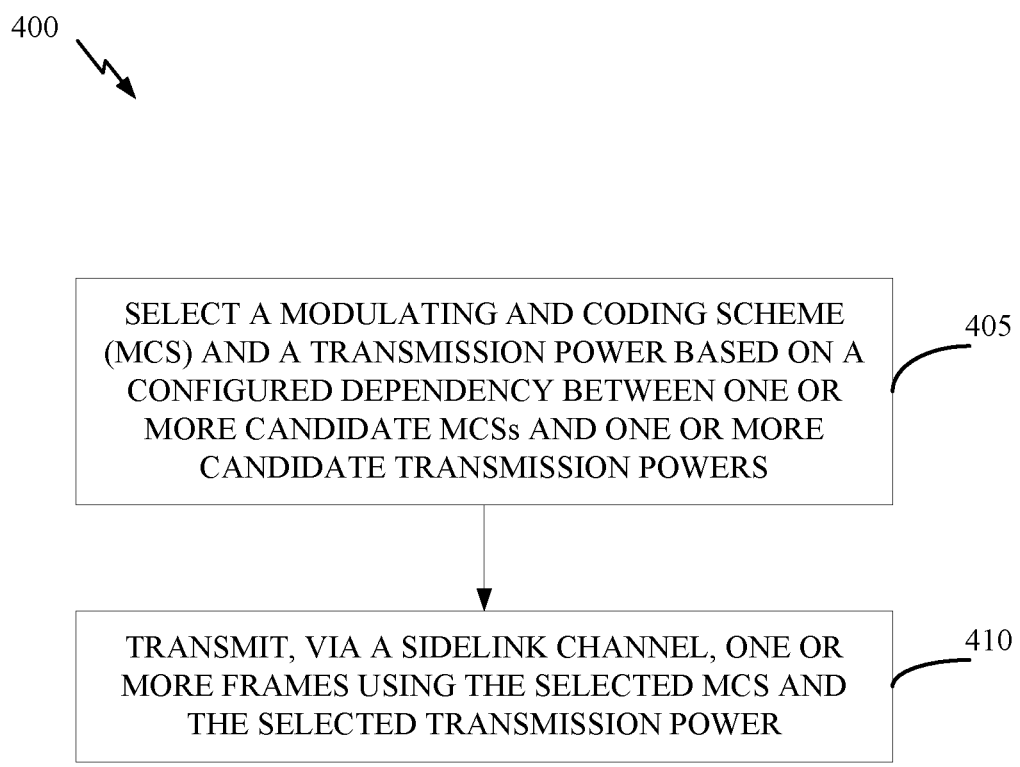
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., such as the UE 120a in the wireless communication network 100).

Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 405, by the UE selecting a MCS and a transmission power based on a configured dependency between one or more candidate MCSs and one or more candidate transmission powers. For instance, the MCS and the transmission power may be selected by selecting one of a set of configured combinations of the one or more candidate MCSs and the one or more candidate transmission powers. For example, each of the set of configured combinations may map one of the candidate MCSs to one or more of the candidate transmission powers. As used herein, the term "configured" generally refers to information being defined at the UE (e.g., via a standard) or configured at the UE by another wireless node (e.g., a base station). At block 410, the UE transmits, via a sidelink channel, one or more frames using the selected MCS and the selected transmission power.

In certain aspects, the UE may transmit one or more channel state information-reference signals (CSI-RSs), and receive a channel state information (CSI)-report. In this case, the selection of the MCS may be further based on one or more parameters (e.g., channel quality indicator (CQI)) of the CSI-report. In some aspects, the UE may also determine a power headroom (PH) of the UE, the MCS being selected further based on the PH. PH generally refers to a difference between a maximum transmit power capability of the UE and a current transmission power setting of the UE. In some cases, the selection of the transmission power may include selecting a transmit power adjustment factor (e.g., +2 dB) with respect to a transmission power of a previous transmission (e.g., previous CSI-RS or data transmission).

FIG. 5 illustrates tables 502, 504 indicating combinations of candidate MCSs and candidate transmission powers, in accordance with certain aspects of the present disclosure. As used herein, the term "table" generally refers any information indicating a relationship between multiple parameters, such as an MCS, transmission power, CQI, and PHR. For example, as illustrated in table 502, if the CQI indicated by the CSI-report is 0, then the UE may select MCS0 or MCS1, and if the CQI indicated by the CSI-report is 1, then the UE may select MCS3 or MCS4. Each of MCS0 and MCS1 is mapped to a transmission power. In other words, if the UE selects MCS0, the UE may set the transmission power adjustment to +0 dB (or any other adjustment factor indicated by the table 502 such a value between +0 db to +2 dB). Moreover, if the UE selects MCS1, the UE may increase the current transmission power setting of the UE by +2 dB (or any other adjustment factor indicated by the table 502 such a value of +2 dB or greater). If the UE selects MCS3, the UE may set the transmission power adjustment to +0 dB (or any other adjustment factor indicated by the table 502 such a value between +0 db to +2 dB). Moreover, if the UE selects MCS4, the UE may increase the current transmission power setting of the UE by +2 dB (or any other adjustment factor indicated by the table 502 such a value of +2 dB or greater).

In certain aspects, the UE may select between MCS0 and MCS1 based on the available PH of the UE. For example, if the PH is less than 2 dB, the UE may select MCS0, and if the PH is greater than 2 dB, the UE may select MCS1. In other words, MCS selection and transmit power adjustment by the transmitter UE may be in accordance with configured dependencies between MCS, transmit power, and CSI feedback (e.g., CQI). The MCS selection may be based on CQI, or other parameters of the CSI-report, depending on the available PH.

In some cases, an MCS may be mapped to a range of transmit powers. For example, MCS1 and MCS4 may be mapped to a transmit power adjustment factor of +2 dB or greater, as illustrated. In other words, the UE may be configured with specific transmit power adjustment values, or given a range to select from based on UE implementation.

As illustrated, each row of the tables 502, 504 may indicate multiple options for combination of MCS and transmit power. For example, in table 504, MCS0 and MCS3 may be mapped to transmit power adjustment of +0 dB (or any other adjustment factor indicated by the table 504 such a value between +0 dB to +2 dB), MCS1 and MCS4 may be mapped to the transmit power adjustment of +2 dB (or any other adjustment factor indicated by the table 504 such a value between +2 dB to +4 dB), and MCS2 and MCS5 may be mapped to a transmit power adjustment of +4 dB (or any other adjustment factor indicated by the table 504 such a value of +4 dB or greater). As described herein, the transmit power adjustment may be with respect to the power level of the CSI-RS transmission, or the power of any other previous transmission (e.g., data transmission).

In some cases, the mapping from CQI to MCS may be according to a static or dynamic table. In other words, the table used for selection of MCS and transmission power may be changed in a dynamic manner. For example, the UE may receive an indication of a set of configured combinations of candidate MCSs and candidate transmission powers. The UE may receive an indication of one of a plurality of tables (e.g., tables 502, 504) indicating the combinations of the candidate MCSs and candidate transmission powers.

The indication of the dependency table may be received from a network entity (e.g., base station) via radio resource control (RRC) signaling or downlink control information (DCI). For example, the base station may indicate a dependency table to be used in a dynamic manner by transmitting DCI that indicates the dependency table (e.g., if the base station detects a change in the interference level associated with the sidelink channel).

The network entity may select one of the tables 502, 504 based on a level of interference associated with the UE transmission. That is, when the base station expects relatively low interference, the base station may select table 504 which allows for a relatively higher transmission power as compared to table 502. In other words, the base station may use the dependency table selection to control the level of sidelink interference. The selected table may be indicated by the base station through RRC configuration or dynamic signaling (e.g., via DCI or medium access control (MAC) control element (MAC-CE)).

In some cases, the indication may be received from another UE via a sidelink control channel or a sidelink broadcast channel. In other words, the choice of the table may be included in the CSI report setting or other configuration/signaling (e.g., through Uu RRC, physical sidelink control channel (PSCCH), or physical sidelink broadcast channel (PSBCH)). While tables 502, 504 of FIG. 5 provide example values or ranges for MCS, transmit power, PH, and CQI to facilitate understanding, the aspects described herein may be implemented using any suitable values or ranges for MCS, transmit power, PH, and CQI depending on implementation.

Figure 6:
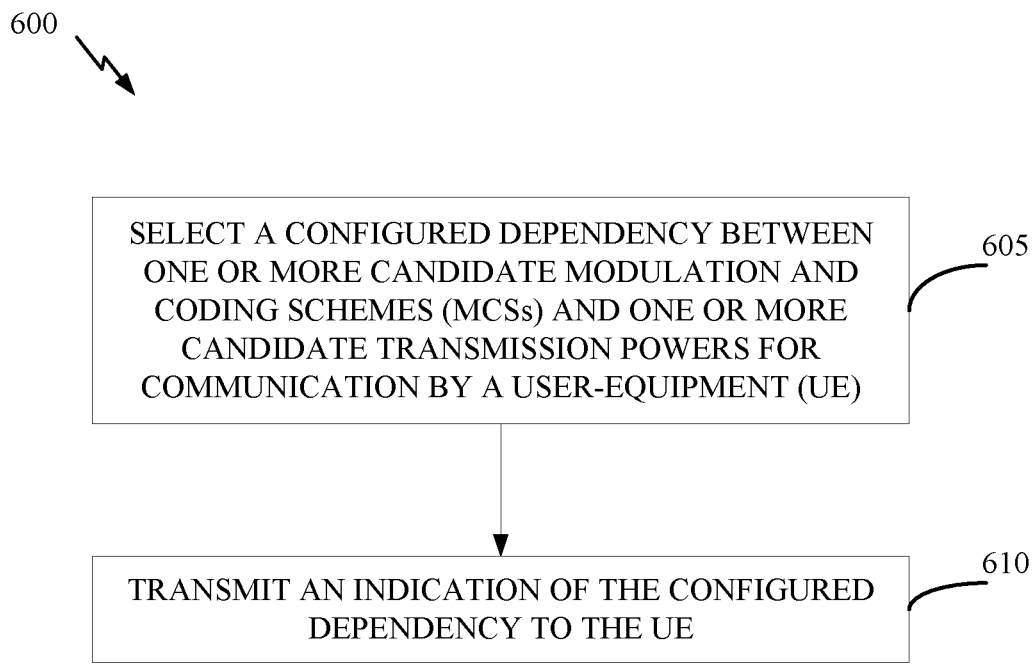
FIG. 6 is a flow diagram illustrating example operations for wireless communication by a wireless node, in accordance with certain aspects of the present disclosure.

FIG. 6 is a flow diagram illustrating example operations 600 for wireless communication, in accordance with certain aspects of the present disclosure. The operations 600 may be performed, for example, by a wireless node, such as a BS (e.g., such as the BS 110*a* in the wireless communication network 100) or a UE (e.g., UE 120*b*).

Operations 600 may be implemented as software components that are executed and run on one or more processors (e.g., controller/processor 240 or 280 of FIG. 2). Further, the transmission and reception of signals by the BS or UE in operations 600 may be enabled, for example, by one or more antennas (e.g., antennas 234 or 252 of FIG. 2). In certain aspects, the transmission and/or reception of signals by the BS may be implemented via a bus interface of one or more processors (e.g., controller/processor 240 or 280) obtaining and/or outputting signals.

The operations 600 may begin, at block 605, by the wireless node selecting a configured dependency between one or more candidate MCSs and one or more candidate transmission powers for communication by a UE. For instance, selecting the configured dependency may include selecting one of a set of configured combinations of the one or more candidate MCSs and the one or more candidate transmission powers. In some cases, each of the set of the configured combinations maps one of the candidate MCSs to one or more of the candidate transmission powers. The wireless node may determine a level of interference associated with the communication by the UE and select the set of configured combinations based on the level of interference. At block 610, the wireless node may transmit an indication of the selected configured dependency to the UE.

In some cases, the selection of the configured dependency may include selecting one of a plurality of tables, each of the tables indicating a combination of the one or more candidate MCSs and the one or more candidate transmission powers based on the level of interference. For example, the selection the one of the plurality of tables may include selecting a table that allows for a relatively higher transmission power if the level of interference is relatively low.

Figure 7:
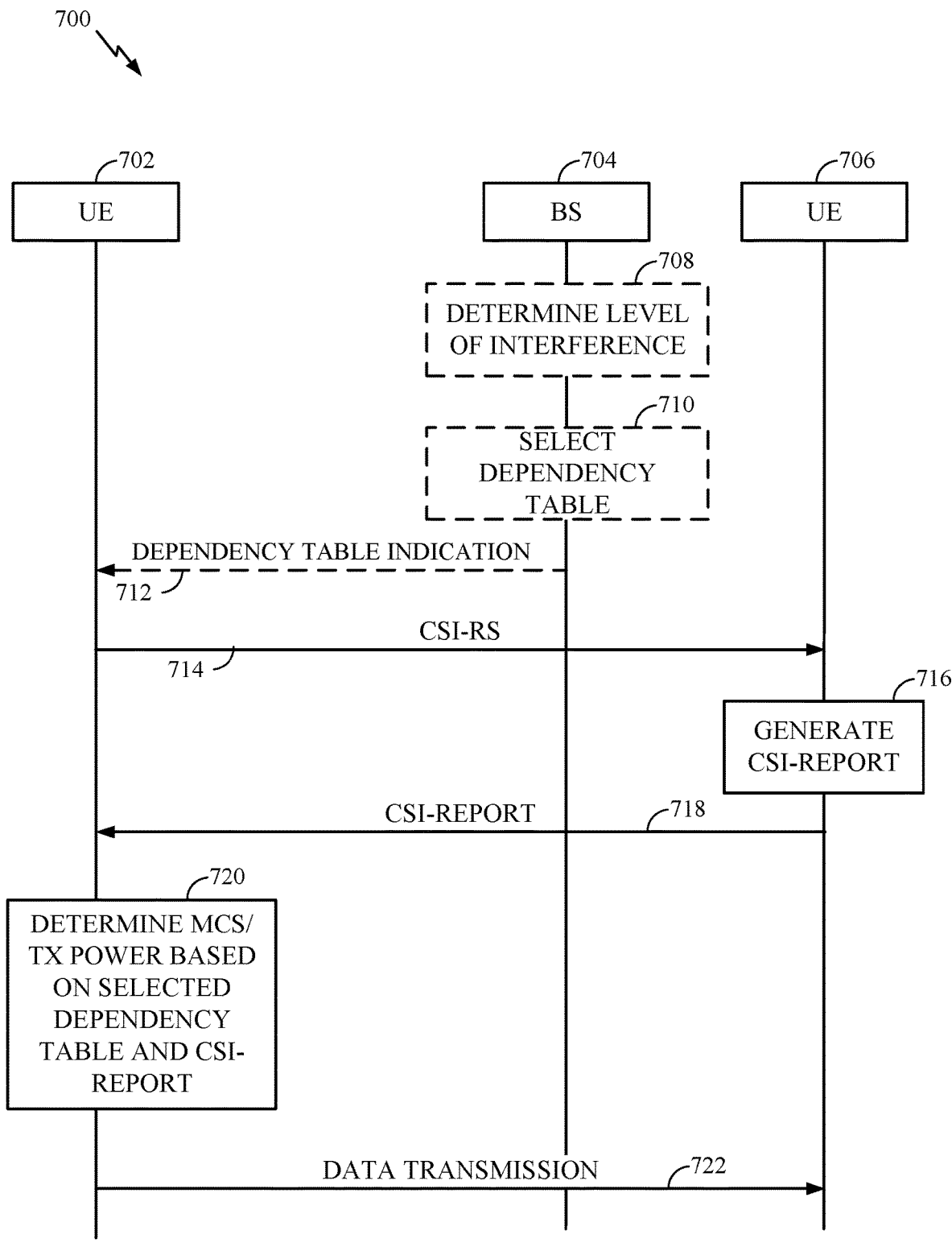
FIG. 7 is a call-flow diagram illustrating example operations for wireless communication, in accordance with certain aspects of the present disclosure.

FIG. 7 is a call-flow diagram illustrating example operations 700 for wireless communication, in accordance with certain aspects of the present disclosure. As illustrated, a BS 704 may determine a level of interference at block 708, and select a dependency table based on the level of interference at block 710. For example, the BS 704 may select a table that allows for a relatively higher transmission power if the level of interference is relatively low. The BS 704 may then transmit an indication 712 of the selected dependency table to UE 702. The determination at block 708, the selection at block 710, and transmission of the indication 712 may be optional operations performed by the base station 704 to configure the UE with one or more dependency tables.

In certain aspects, the UE 702 may transmit CSI-RS 714 to UE 706, based on which the UE 706 may generate a CSI-report at block 716, and transmit the CSI-report 718 to the UE 702. As described herein, the CSI-report may include a variety of channel quality metrics, such as CQI, PMI, CRI, SLI, RI, and RSRP (e.g., for beam management). At block 720, the UE 702 may determine MCS and transmission power based on the selected dependency table and the CSI-report (e.g., CQI). The determined MCS and transmission power may be used for data transmission 722.

Figure 8:
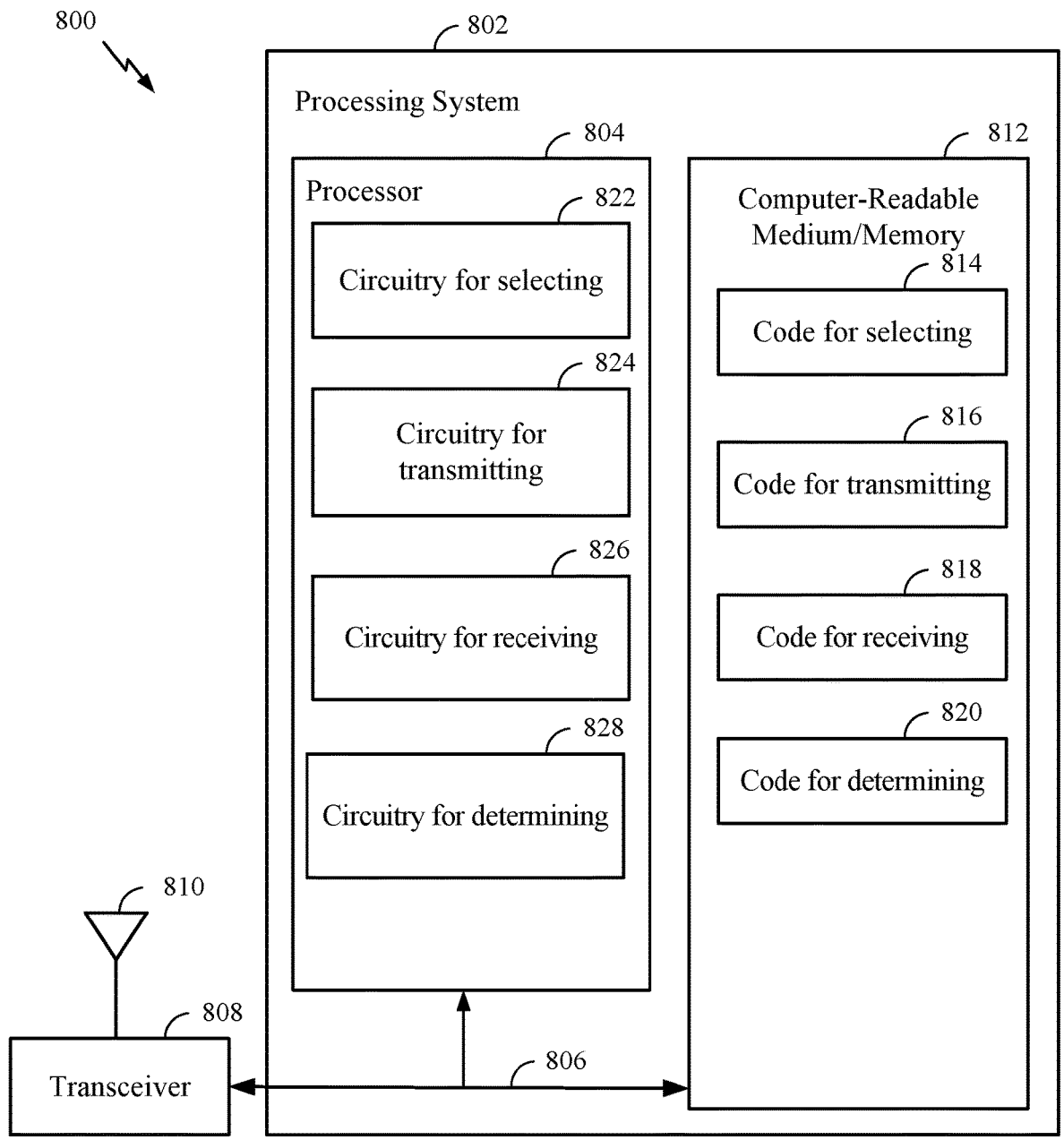
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIGS. 4 and 6. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIGS. 4 and 6, or other operations for performing the various techniques discussed herein for sidelink communication. In certain aspects, computer-readable medium/memory 812 stores code 814 (e.g., an example of means for) for selecting (e.g., selecting an MCS and transmission power or selecting a set of configured combinations of candidate MCS and transmissions powers); code 816 (e.g., an example of means for) for transmitting, code 818 (e.g., an example of means for) for receiving, code 820 for determining (e.g., determining PHR or determining level of interference). One or more of code 814, 816, 818 may be executed by a general-purpose processor, a digital signal processor (DSP), an application-specific integrated circuit (ASIC), a field programmable gate array (FPGA) or other programmable logic device. In certain aspects, the processor 804 has circuitry executes the code stored in the computer-readable medium/memory 812. In certain aspects, computer-readable medium/memory 812 is an example of the sidelink feedback manager 112 or the sidelink feedback manager 122.

In certain aspects, alternatively or additionally, processor 804 includes circuitry 822 (e.g., an example of means for) for selecting (e.g., selecting an MCS and transmission power or selecting a set of configured combinations of candidate MCS and transmissions powers); circuitry 824 (e.g., an example of means for) for transmitting, circuitry 826 for receiving, and circuitry 828 (e.g., an example of means for) for determining (e.g., determining PHR or determining level of interference). One or more of circuitry 822, 824, 826, 828 may be implemented by one or more of a general-purpose processor, a digital signal processor (DSP), an application-specific integrated circuit (ASIC), a field programmable gate array (FPGA) or other programmable logic device. In certain aspects, processor 804 is an example of the sidelink feedback manager 112 or the sidelink feedback manager 122.

The transceiver 808 may provide a means for receiving information such as packets, user data, or control information associated with various information channels (e.g., control channels, data channels, and information related to sidelink). Information may be passed on to other components of the device 800. The transceiver 808 may be an example of aspects of the transceiver 254 described with reference to FIG. 2. The antenna 1210 may correspond to a single antenna or a set of antennas. The transceiver 808 may provide means for transmitting signals generated by other components of the device 800.

The sidelink feedback manager 112 or the sidelink feedback manager 122 may support wireless communication in accordance with examples as disclosed herein.

The sidelink feedback manager 112 or the sidelink feedback manager 122 may be an example of means for performing various aspects described herein. The sidelink feedback manager 112 or the sidelink feedback manager 122, or its sub-components, may be implemented in hardware (e.g., in uplink resource management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the sidelink feedback manager 112 or the sidelink feedback manager 122, or its sub-components, may be implemented in code (e.g., as uplink resource management software or firmware) executed by a processor, or any combination thereof. If implemented in code executed by a processor, the functions of the sidelink feedback manager 112 or the sidelink feedback manager 122, or its sub-components may be executed by a general-purpose processor, a digital signal processor (DSP), an application-specific integrated circuit (ASIC), a field programmable gate array (FPGA) or other programmable logic device.

In some examples, the sidelink feedback manager 112 or the sidelink feedback manager 122 may be configured to perform various operations (e.g., receiving, determining, transmitting) using or otherwise in cooperation with the transceiver 808.

The sidelink feedback manager 112 or the sidelink feedback manager 122, or its sub-components, may be physically located at various positions, including being distributed such that portions of functions are implemented at different physical locations by one or more physical components. In some examples, the sidelink feedback manager 112 or the sidelink feedback manager 122, or its sub-components, may be a separate and distinct component in accordance with various aspects of the present disclosure. In some examples, the sidelink feedback manager 112 or the sidelink feedback manager 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Aspects

Aspect 1. A method for wireless communication by a user-equipment (UE), comprising: selecting a modulating and coding scheme (MCS) and a transmission power based on a configured dependency between one or more candidate MCSs and one or more candidate transmission powers; and transmitting, via a sidelink channel, one or more frames using the selected MCS and the selected transmission power.

Aspect 2. The method of aspect 1, wherein the MCS and the transmission power are selected by selecting one of a set of configured combinations of the one or more candidate MCSs and the one or more candidate transmission powers.

Aspect 3. The method of any one of aspects 1-2, wherein the selecting of the MCS and the transmission power comprises: selecting the MCS; and selecting the transmission power based on the selection of the MCS.

Aspect 4. The method of any one of aspects 1-3, wherein the selection comprises: selecting the transmission power; and selecting the MCS based on the selection of the transmission power.

Aspect 5. The method of any one of aspects 1-4, wherein the MCS and the transmission power are selected by selecting one of a set of configured combinations of the one or more candidate MCSs and the one or more candidate transmission powers, and wherein each of the set of configured combinations maps one of the candidate MCSs to one or more of the candidate transmission powers.

Aspect 6. The method of any one of aspects 1-5, further comprising: transmitting one or more channel state information-reference signals (CSI-RS); and receiving a channel state information (CSI)-report, wherein the selection of the MCS is further based on one or more parameters of the CSI-report.

Aspect 7. The method of aspect 6, wherein the one or more parameters of the CSI-report comprises a channel quality indicator (CQI).

Aspect 8. The method of any one of aspects 1-7, further comprising determining a power headroom (PH) of the UE, the MCS being selected further based on the PH.

Aspect 9. The method of aspect 8, wherein the PH comprises a difference between a maximum transmit power capability of the UE and a current transmission power setting of the UE for data transmission.

Aspect 10. The method of any one of aspects 1-9, wherein the selection of the transmission power comprises selecting a transmit power adjustment factor with respect to a transmission power of a previous transmission.

Aspect 11. The method of any one of aspects 1-10, further comprising receiving an indication of the configured dependency between the candidate MCSs and the candidate transmission powers.

Aspect 12. The method of aspect 11, wherein the received indication comprises receiving an indication of one of a plurality of tables, each of the plurality of tables indicating a combination of the one or more candidate MCSs and the one or more candidate transmission powers.

Aspect 13. The method of any one of aspects 11-12, wherein the indication is received from a network entity via radio resource control (RRC) signaling or downlink control information (DCI).

Aspect 14. The method of any one of aspects 11-13, wherein the indication is received from another UE via a sidelink control channel or a sidelink broadcast channel.

Aspect 15. A method for wireless communication, comprising: selecting a configured dependency between one or more candidate modulation and coding schemes (MCSs) and one or more candidate transmission powers for communication by a user-equipment (UE); and transmitting an indication of the configured dependency to the UE.

Aspect 16. The method of aspect 15, wherein the configured dependency is to be used for selection of an MCS and transmission power for communication by the UE using a sidelink channel.

Aspect 17. The method of any one of aspects 15-16, wherein selecting the configured dependency comprises selecting one of a set of configured combinations of the one or more candidate MCSs and the one or more candidate transmission powers.

Aspect 18. The method of any one of aspects 15-17, wherein selecting the configured dependency comprises selecting one of a set of configured combinations of the one or more candidate MCSs and the one or more candidate transmission powers, and wherein each of the set of the configured combinations maps one of the candidate MCSs to one or more of the candidate transmission powers.

Aspect 19. The method of any one of aspects 15-18, further comprising determining a level of interference associated with the communication by the UE, the selection of the configured dependency being based on the level of interference.

Aspect 20. The method of aspect 19, wherein the selection of the configured dependency comprises selecting one of a plurality of tables, each of the plurality of tables indicating a combination of the one or more candidate MCSs and the one or more candidate transmission powers based on the level of interference.

Aspect 21. The method of aspect 20, wherein the selection the one of the plurality of tables comprises selecting a table that allows for a relatively higher transmission power if the level of interference is relatively low.

Aspect 22. The method of any one of aspects 15-21, wherein the indication is transmitted, by a network entity, via radio resource control (RRC) signaling or downlink control information (DCI).

Aspect 23. The method of any one of aspects 15-22, wherein the indication is transmitted, by another UE, via a sidelink channel.

Aspect 24. An apparatus for wireless communication by a user-equipment (UE), comprising: a memory; and one or more processors coupled to the memory, the one or more processors and the memory being configured to: select a modulating and coding scheme (MCS) and a transmission power based on a configured dependency between one or more candidate MCSs and one or more candidate transmission powers; and transmit, via a sidelink channel, one or more frames using the selected MCS and the selected transmission power.

Aspect 25. A apparatus for wireless communication, comprising: a memory; and one or more processors coupled to the memory, the one or more processors and the memory being configured to: select a configured dependency between one or more candidate modulation and coding schemes (MCSs) and one or more candidate transmission powers for communication by a user-equipment (UE); and transmit an indication of the configured dependency to the UE.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more operations or actions for achieving the methods. The method operations and/or actions may be interchanged with one another without departing from the scope of the claims. In other words, unless a specific order of operations or actions is specified, the order and/or use of specific operations and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4 and 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
   receiving an indication of a configured dependency between one or more candidate modulating and coding schemes (MCSs) and one or more candidate transmission powers,
      wherein the indication indicates a table of a plurality of tables, each of the plurality of tables indicating a combination of the one or more candidate MCSs and the one or more candidate transmission powers based at least in part on a level of interference associated with transmissions by the UE;
   selecting a MCS and a transmission power based at least in part on the configured dependency between the one or more candidate MCSs and the one or more candidate transmission powers; and
   transmitting, via a sidelink channel, one or more frames using the selected MCS and the selected transmission power.

2. The method of claim 1, wherein the MCS and the transmission power are selected by selecting one of a set of configured combinations of the one or more candidate MCSs and the one or more candidate transmission powers.

3. The method of claim 1, wherein the selecting of the MCS and the transmission power comprises:
   selecting the MCS; and
   selecting the transmission power based on the selection of the MCS.

4. The method of claim 1, wherein the selection comprises:
   selecting the transmission power; and
   selecting the MCS based on the selection of the transmission power.

5. The method of claim 1, wherein the MCS and the transmission power are selected by selecting one of a set of configured combinations of the one or more candidate MCSs and the one or more candidate transmission powers, and wherein each of the set of configured combinations maps one of the candidate MCSs to one or more of the candidate transmission powers.

6. The method of claim 1, further comprising:
   transmitting one or more channel state information-reference signals (CSI-RS); and
   receiving a channel state information (CSI)-report, wherein the selection of the MCS is further based on one or more parameters of the CSI-report.

7. The method of claim 6, wherein the one or more parameters of the CSI-report comprises a channel quality indictor (CQI).

8. The method of claim 1, further comprising determining a power headroom (PH) of the UE, the MCS being selected further based on the PH.

9. The method of claim 8, wherein the PH comprises a difference between a maximum transmit power capability of the UE and a current transmission power setting of the UE for data transmission.

10. The method of claim 1, wherein the selection of the transmission power comprises selecting a transmit power adjustment factor with respect to a transmission power of a previous transmission.

11. The method of claim 1, wherein the indication is received from a network entity via radio resource control (RRC) signaling or downlink control information (DCI).

12. The method of claim 1, wherein the indication is received from another UE via a sidelink control channel or a sidelink broadcast channel.

13. A method for wireless communication, comprising:
   selecting, based at least in part on a level of interference by transmissions of a user equipment (UE), a configured dependency between one or more candidate modulation and coding schemes (MCSs) and one or more candidate transmission powers for the communication by the UE,
      wherein selecting the configured dependency comprises selecting a table of a plurality of tables, each of the plurality of tables indicating a combination of the one or more candidate MCSs and the one or more candidate transmission powers based at least in part on the level of interference associated with transmissions by the UE; and
   transmitting an indication of the configured dependency to the UE,
      wherein the indication indicates the table.

14. The method of claim 13, wherein the configured dependency is to be used for selection of an MCS and transmission power for communication by the UE using a sidelink channel.

15. The method of claim 13, wherein selecting the configured dependency comprises selecting one of a set of configured combinations of the one or more candidate MCSs and the one or more candidate transmission powers.

16. The method of claim 13, wherein selecting the configured dependency comprises selecting one of a set of configured combinations of the one or more candidate MCSs and the one or more candidate transmission powers, and wherein each of the set of the configured combinations maps one of the candidate MCSs to one or more of the candidate transmission powers.

17. The method of claim 13, wherein the selection the one of the plurality of tables comprises selecting a table that allows for a relatively higher transmission power if the level of interference is relatively low.

18. The method of claim 13, wherein the indication is transmitted, by a network entity, via radio resource control (RRC) signaling or downlink control information (DCI).

19. The method of claim 13, wherein the indication is transmitted, by another UE, via a sidelink channel.

20. An apparatus for wireless communication by a user equipment (UE), comprising:
   a memory; and
   one or more processors coupled to the memory, the one or more processors and the memory being configured to:
      receive an indication of a configured dependency between one or more candidate modulating and coding schemes (MCSs) and one or more candidate transmission powers,
         wherein the received indication indicates a table of a plurality of tables, each of the plurality of tables indicating a combination of the one or more candidate MCSs and the one or more candidate transmission powers based at least in part on a level of interference associated with transmissions by the UE;
      select a MCS and a transmission power based at least in part on the configured dependency between the one or more candidate MCSs and the one or more candidate transmission powers; and
      transmit, via a sidelink channel, one or more frames using the selected MCS and the selected transmission power.

21. An apparatus for wireless communication, comprising:
   a memory; and
   one or more processors coupled to the memory, the one or more processors and the memory being configured to:
      select, based at least in part on a level of interference by transmissions of a user equipment (UE), a configured dependency between one or more candidate modulation and coding schemes (MCSs) and one or more candidate transmission powers for the communication by the UE,
         wherein selecting the configured dependency comprises selecting a table of a plurality of tables, each of the plurality of tables indicating a combination of the one or more candidate MCSs and the one or more candidate transmission powers based at least in part on the level of interference associated with transmissions by the UE; and
      transmit an indication of the configured dependency to the UE,
         wherein the indication indicates the selected table.

* * * * *